United States Patent
Sims et al.

(10) Patent No.: US 12,093,196 B2
(45) Date of Patent: Sep. 17, 2024

(54) POWER SUPPLY COMMUNICATIONS VIA A SHARED CHANNEL FOR PERFORMANCE MANAGEMENT

(71) Applicant: Intel Corporation, Santa Clara, CA (US)

(72) Inventors: Rob W. Sims, Forest Grove, OR (US); Aurelio Rodriguez Echevarria, Zapopan (MX); Jorge P. Rodriguez, Portland, OR (US); Phil R. Lehwalder, Hillsboro, OR (US); Sivasankarareddy Juturu, Bangalore (IN); Stephen P. Eastman, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 17/711,380

(22) Filed: Apr. 1, 2022

(65) Prior Publication Data

US 2023/0315658 A1 Oct. 5, 2023

(51) Int. Cl.
  *G06F 13/20* (2006.01)
  *G06F 1/26* (2006.01)
  *G06F 1/28* (2006.01)

(52) U.S. Cl.
  CPC .......... *G06F 13/20* (2013.01); *G06F 2213/40* (2013.01)

(58) Field of Classification Search
  CPC .............................. G06F 1/186; H01R 12/716
  See application file for complete search history.

(56) References Cited

U.S. PATENT DOCUMENTS

| | | | |
|---|---|---|---|
| 10,381,758 B1 * | 8/2019 | Scanlon | H01R 12/716 |
| 10,523,479 B2 | 12/2019 | Burr | |
| 10,963,031 B2 | 3/2021 | Griffith et al. | |
| 2009/0270131 A1 * | 10/2009 | Zhou | H04M 11/04 455/572 |

(Continued)

FOREIGN PATENT DOCUMENTS

CN 213213322 U 5/2021

OTHER PUBLICATIONS

Extended European Search Report, EP App. No. 23159010.0, Sep. 15, 2023, 10 pages.

(Continued)

*Primary Examiner* — Getente A Yimer
(74) *Attorney, Agent, or Firm* — NICHOLSON DE VOS WEBSTER & ELLIOTT LLP

(57) ABSTRACT

A power supply comprising a hardware interface having conductive contacts and conforming to a power supply design standard comprising a pin-out definition specifying that a first conductive contact is to be dedicated to communicating first information of a first type. The power supply comprises first, second, and third circuitry. The first circuitry is to determine the first information. The second circuitry is to determine second information of a second type, wherein the second type of information is other than the first type. The third circuitry is to send, via the first conductive contact, a communication comprising the first information and the second information. In embodiments, a PCB comprises a connector to couple the PCB to the power supply via an interconnect to be coupled to the hardware interface, and an IC to receive the communication, and identify the first and second information.

15 Claims, 6 Drawing Sheets

(56) References Cited

U.S. PATENT DOCUMENTS

| | | | |
|---|---|---|---|
| 2010/0259279 A1* | 10/2010 | Shearon | H03K 19/1732 324/538 |
| 2011/0007483 A1* | 1/2011 | Li | G06F 1/186 361/752 |
| 2011/0063020 A1* | 3/2011 | Kim | G01R 31/28 327/538 |
| 2012/0076050 A1* | 3/2012 | Masuda | H04L 12/413 370/254 |
| 2012/0128081 A1* | 5/2012 | Hikihara | H04B 3/54 375/257 |
| 2013/0049675 A1* | 2/2013 | Minami | G06F 1/266 320/103 |
| 2021/0405732 A1 | 12/2021 | Amireddy et al. | |

OTHER PUBLICATIONS

Intel, "ATX12VO (12V Only) Desktop Power Supply", Design Guide, Revision 002, May 2020, 74 pages.

* cited by examiner

POWER SUPPLY COMMUNICATIONS VIA A SHARED CHANNEL FOR PERFORMANCE MANAGEMENT

BACKGROUND

1. Technical Field

This disclosure relates to computer systems, and more specifically, to communications between a power supply and other system components.

2. Background Art

In computer systems, such as desktop, mobile and server type systems, several voltages or power supply rails are required to supply power to different components. Power is provided by a power supply unit that converts electricity from mains alternating current (AC) to low-voltage, regulated direct current (DC).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only. Elements of the figures having the same reference numbers (or names) as the elements of any other figure can operate or function in any manner similar to that described, but are not limited to such.

DETAILED DESCRIPTION

Figure 1:
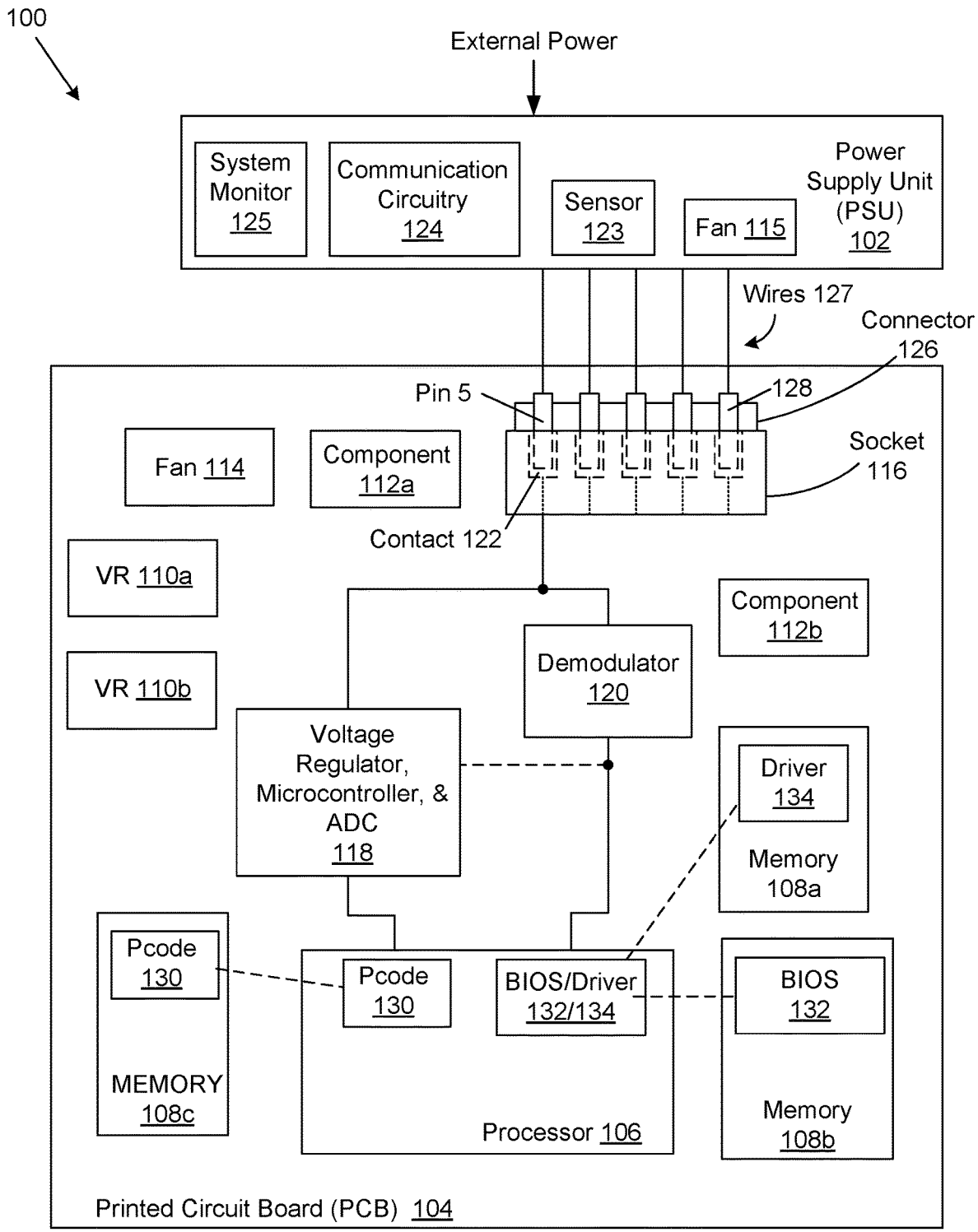
FIG. 1 is a functional block diagram illustrating elements of a computing system providing power supply communications via a shared channel for performance management in accordance with some embodiments.

Computer systems are continuing to evolve. In early desktop systems, the power supply unit (PSU) supplied two main voltages: +5 V and +12 V. Later PSUs supplied additional voltages. For example, an ATX (Advanced Technology Extended) power supply supplies +5V, +3.3V, +12V, –12V, +5V (stand by). More recently, in order to improve PSU efficiency, some systems are using a PSU that supplies a single voltage of +12 V, with other power rails provided by voltage regulation circuitry on a motherboard.

Computer systems typically include a motherboard and a PSU. A connector on the motherboard connects the PSU to the motherboard. A PSU can provide a variety of voltages. For example, an Advanced Technology Extended (ATX) power supply supplies +5V, +3.3V, +12V, –12V, +5V (stand by). In order to improve PSU efficiency, some systems use a PSU that conforms to an Advanced Technology Extended 12V Only (ATX12VO) power supply standard, which specifies that the PSU provide a single voltage of +12 V, with other power rails provided by voltage regulation circuitry on a motherboard.

Power supply design standards typically specify requirements, recommendations, and options for electrical and mechanical characteristics of a PSU. Power supply design standards may also address acoustics, environmental conditions, electromagnetic compatibility, safety, and reliability. In particular, a power supply design standard may specify requirements for AC and DC connectors. The DC connector specification may include a pinout and profiles for main and supplemental power connectors. The pinout shows the location of each conductive contact or pin on a connector and a function associated with pin.

A PSU that provides multiple voltage rails, such as an ATX power supply, uses a 24-pin motherboard connector. In contrast, a PSU that complies with the ATX12VO power supply standard, uses a 10-pin motherboard connector.

To manage power consumption in a computer system, it would be helpful for a power management controller to have information about characteristics of the PSU, such as PSU parameters, PSU environmental information, component health information, and PSU historical data. One example of a PSU parameter is a maximum power rating of the PSU. However, all the pins of the ATX12VO power supply standard are fully utilized. While additional pins could be added to a hardware interface of a PSU to communicate characteristics of the PSU, this is undesirable for several reasons. First, the hardware interface of the PSU would not be compatible with the power supply standard. This means the hardware interface would not be compatible with a motherboard connector that conforms to the standard, and would not be backwards-compatible compatible with computer systems having previously distributed motherboard connectors. In addition, additional pins would undesirably increase the size of the hardware interface and motherboard connector. In some cases, a computer system may not have room to accommodate additional pins.

In embodiments, a pin of a power supply standard is dedicated to communicating telemetry information, e.g., power consumption being drawn from the power supply. In embodiments, a pin dedicated to communicating first information of a first type, e.g., power consumption telemetry, is also used for communicating second information of a second type. The second type of information may comprise any of environmental information, component health information, PSU parameter information, and PSU historical data. In some embodiments, the first and second information is communicated on the dedicated pin via a multiplexing technique. In some embodiments, the first and second information is communicated on the dedicated pin via a technique in which the first information is a first signal in a first range of frequencies and the second information is digital information modulated as a second signal in a second range of frequencies.

Embodiments are directed to a power supply comprising a hardware interface having conductive contacts and conforming to a power supply design standard comprising a pin-out definition specifying that a first conductive contact is to be dedicated to communicating first information of a first type. The power supply comprises first, second, and third circuitry. The first circuitry is to determine the first information. The second circuitry is to determine second information of a second type, wherein the second type of information is other than the first type. The third circuitry is to send via the first conductive contact a communication comprising the first information and the second information. In embodiments, a PCB comprises a connector to couple the PCB to the power supply via an interconnect to be coupled to the hardware interface, and an IC to receive the communication, and identify the first and second information.

An advantage of various embodiments is that information about a PSU that is useful for managing power consumption can be communicated to power management circuitry of a computer system without adding pins to the hardware interface and motherboard connector coupling the PSU to the computer system. Another advantage is that this information about a PSU can be communicated to the computer system using a hardware interface and motherboard connector that conforms to a power supply design standard.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. A module may comprise a circuit or circuitry, as defined below. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The terms "functional block," "functional unit," or "component" herein generally refer to any circuitry that performs a particular function. A "functional block" or "component" may be a unit of logic, circuit, cell, or chip layout that is reusable. A functional block is sometimes colloquially referred to as an IP (intellectual property) block. A few examples of functional blocks or components include processor cores, memories, caches, floating point processors, memory controllers, bus controllers, graphics processors, transceivers, network interface controllers, and display controllers. One or more portions of a larger functional block can themselves be designated as functional blocks. For example, an instruction execution unit and cache controller can be functional units or components of a processor functional unit. It should be appreciated that the foregoing examples are a non-exhaustive list of functional blocks.

As used herein, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processing units (GPU). In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuits and circuitry can include two or more instances of circuitry. Circuits and circuitry may comprise a combination of hardware elements that cooperate to provide one or more functions. A particular instance of a circuits and circuitry may be referred to with a descriptive or non-descriptive label. For example, instances of circuits and circuitry that perform various functions may be referred to as receiver circuitry, processor circuitry, first circuit, or second circuit. Each of two or more instances of a circuit and circuitry can be comprised of distinct components. In addition, two or more instances of a circuit or circuitry can share one or more common components or resources.

As used herein, the term "hardware interface" refers to one or more physical components of a given device, where said one or more physical components accommodate coupling to interact with one or more physical components of another device, e.g., via electrical or optical signals. For example, a hardware interface may comprise conductive contacts of a connector or a socket that receives a connector. As another example, a hardware interface may comprise metal contacts, pads, metallization features, or other interconnect structures on a surface of or within a circuit board or integrated circuit (IC) chip. As a further example, a hardware interface may comprise an interconnect between contacts of respective components, such as solder or an interposer.

As used herein, the term "packaged device" means an integrated circuit (IC) comprising at least one IC chip. A packaged device may be a single IC chip or a host IC chip and one or more IC chiplets coupled to the host IC chip. The term "IC chiplet" refers to an IC die structure that is smaller than the host chip. A host die and an IC chiplet may be electrically interconnected with one another via a hardware.

FIG. 1 is a functional block diagram illustrating elements of a computing system providing power supply communications via a shared channel for performance management in accordance with some embodiments. FIG. 1 schematically illustrates a computing device 100 (also referred to henceforth as device 100, or computing platform 100) that enables a PSU to communicate more than one type of data over a single wire to a controller, processor, or other device that may manage power consumption or perform other functions, according to some embodiments. In various embodiments, the device 100 may be any appropriate computing device or computing platform, e.g., a server system, a server rack, a laptop, a desktop, a mobile computing device, a cellular phone, and/or the like.

The device 100 may comprise a PSU 102, a printed circuit board (PCB) 104, and a processor 106. Although the device 100 may comprise multiple processors or a system-on-chip (SoC), the example of FIG. 1 illustrates merely a single processor for purposes of illustrative clarity. The processor or SoC may include multiple processing cores.

An external power source supplies power to the PSU 102, such as an AC main. In the example of FIG. 1, it is assumed that the device 100 does not include a battery and battery charger, although the device 100 may include a battery and battery charger in some embodiments. For example, PSU 102 may include a battery and battery charger in an embodiment. Although not illustrated in FIG. 1, the PSU 102 supplies power to various components of the device 100.

In some embodiments, the device 100 may comprise memories 108a, 108b, and 108c, voltage regulators (VR) 110a, 110b, components, 112a, 112b, fan 114, socket 116, connector 126, VR unit 118, and demodulator 120.

Elements referred to herein with a common reference label followed by a particular number or letter may be collectively referred to by the reference label alone. For example, VRs 110a, 110b may be collectively and generally referred to as VRs 110 in plural, and VR 110 in singular.

Memories 108 may comprise any of the examples tangible computer-readable media enumerated elsewhere herein, such as, but not limited to, read only memory (ROM), random access memory (RAM), and flash memory devices. Although the device 100 may comprise multiple memories 108, the example of FIG. 1 illustrates merely three memories for purposes of illustrative clarity.

In various embodiments, voltage regulators 110 provide a steady, fixed output voltage that remains constant for any changes in an input voltage or load conditions. VRs 110 act as direct current DC-to-DC power converters which step down voltage (while stepping up current) from its input (supply) to its output (load). For example, VR 110*a* may provide a regulated voltage of +3.3V and VR 110*a* may provide a regulated voltage of +5.0V. In some embodiments, rather than providing a single, fixed output voltage, VRs 110 provide a variable output voltage that can be changed by a host during runtime. Once set by the host, the VR maintains the voltage despite changes in input voltage or load on the output. Although the device 100 may comprise multiple VRs 110, the example of FIG. 1 illustrates merely two VRs for purposes of illustrative clarity.

The device 100 may comprise other components that are generally labelled as 112*a*, 112*b*, and a fan 114 on PCB 104. The components 112 may comprise any of a variety of components typically provided on a motherboard of a computer system.

Socket 116 may comprise a plurality of conductive contacts 122, each adapted to receive one of a plurality of pins 128 of connector 126. Device 100 comprises a plurality of wires 127. Each wire respectively couples one of the pins 128 of connector 126 to the PSU 102. The socket 116 may be mounted on PCB 104 and connector 126 may be inserted in socket 116. While not shown in FIG. 1, socket 116 is coupled with and provides power to the various components mounted on PCB 104, e.g., processor 106, memories 108, components 112, and fan 114.

A power supply design standard may specify requirements for connectors and sockets. The connector specification of the power supply design standard may include a pinout and profiles for power connectors and sockets. The pinout shows the location of each conductive contact 122 on a socket and pin 128 on a connector, as well as a function associated with each contact 122 and associated pin 128.

Table 1 shows a pinout for the example power socket 116 and connector 126 that may be specified in an exemplary power supply design standard. While only five contacts and pins are shown in FIG. 1 for purposes of illustrative clarity, in this example, the socket 116 and connector 126 includes ten conductive contact or pins as shown in Table 1. As can be seen from Table 1, a single function is associated with each of the pins. For example, pin 5 is associated with a P_SYS signal. In addition, as can be seen from Table 1, there are no pins available for any additional functions.

TABLE 1

| Pin | Signal |
| --- | --- |
| 1 | PS_ON# |
| 2 | COM |
| 3 | COM |
| 4 | COM |
| 5 | P_SYS |
| 6 | PWR_OK |
| 7 | +12 V SB |
| 8 | +12 V |
| 9 | +12 V |
| 10 | +12 V |

In the example power supply design standard of FIG. 1 and Table 1, pins 8-10 are each assigned to carry 12V DC power signals, pin 7 is assigned to carry a standby 12V DC power signal, pins 2-4 are assigned to serve a COM (or common ground function), and the remaining pins are for informational signals. Pin 1 is associated with PS_ON #, which allows a motherboard to remotely control PSU 102 in conjunction with features such as soft on/off, Wake on LAN, or wake-on-modem. Pin 6 is associated with PWR_OK, which, when asserted, signals that the DC power signals are above undervoltage thresholds. Pin 5 is associated with P_SYS, which is an analog signal that is proportional to the real-time power provided by PSU 102.

As one of ordinary skill in the art will appreciate, a computer system design that deviates from the number of pins in the pinout specified in a power supply design standard is not compliant with the standard. For example, a computer system that employs an eleven-pin pinout would not conform to the power supply design standard of example of FIG. 1 and Table 1. A computer system that that does not associate the function/signal with a pin as specified in the power supply design standard example is not compliant with the standard. For example, a computer system that associates pin 10 with +3.3V would not conform to the power supply design standard example of FIG. 1 and Table 1. As another example, a computer system that associates pin 5 solely with some informational signal other than P_SYS would not conform to the power supply design standard example of FIG. 1 and Table 1. However, it will be appreciated by one of ordinary skill that a computer system that associates pin 5 with the P_SYS signal, but also overlays another signal on pin 5 in a way that does not interfere with P_SYS signal would comply with the power supply design standard of FIG. 1 and Table 1. In addition, one of ordinary skill in the art will appreciate that a computer system that associates pin 5 with the P_SYS signal during normal operation, but places a different signal on pin 5 in a time interval during which the PSU is not operational would comply with the power supply design standard of FIG. 1 and Table 1, e.g., in a time interval when device 100 is transitioning from an off state to an active state in which the processor executes instructions. In various embodiments, computer system 100, PSU 102, power socket 116, and connector 126 comply with a power supply design standard, such as the example standard shown in FIG. 1 and Table 1. In various embodiments, computer system 100, PSU 102, power socket 116, and connector 126 comply with an ATX12VO power supply design standard.

Embodiments described in this description relate to power supply design standards used in the manufacture of computer systems. The ATX12VO is one example of a power supply design standard. While ATX12VO may be used as an example of a power supply design standard in this description, it should be appreciated that the present disclosure is not limited to ATX12VO. It should be understood that descriptions about ATX12VO may be applicable to any other power supply design standard or specification.

VR unit 118, like VRs 110 provides a regulated output voltage. In addition, VR unit 118 may comprise a microcontroller and an analog-to-digital (ADC) converter integrated with the unit. In an embodiment, VR unit 118 may be an Intel Mobile Voltage Positioning (IMVP) VR controller. In some embodiments, the microcontroller and ADC converter are provided as discrete devices separate from the VR unit 118. The microcontroller of VR unit 118 may execute computer-readable instructions. In an embodiment, the microcontroller of VR unit 118 may be configured to adjust the voltage provided to a processor based on processor activity or perform other operations for managing power consumed by device 100. In an embodiment, VR unit 118 receives the P_SYS signal, which is analog in form, and the ADC converts the P_SYS signal to digital form. In an embodiment, the processor 106 executes Pcode 130 using the digital version of the P_SYS signal to manage power consumption of device 100.

In some embodiments, the microcontroller of VR unit 118, or processor 106 executing Pcode, manages power consumption of device 100 using information that is additional to the information provided in the P_SYS signal. As further described below, in some embodiments, the additional information may be communicated from PSU 102 to VR unit 118 on pin 5 in a time period during which PSU 102 is not fully operational. In some embodiments, the additional information may be communicated from PSU 102 to VR unit 118 or demodulator 120 on pin 5 by overlaying a signal on pin 5 in a way that does not interfere with the P_SYS signal. In some embodiments, VR unit 118 performs a demodulation function, while in other embodiments, separate circuitry, e.g., demodulator 120, performs the demodulation function. The information that is in addition to the P_SYS signal may be provided to Pcode 130, BIOS 132, driver 134, or all of the foregoing in various embodiments. The information that is in addition to the P_SYS signal may be provided to VR unit 118 by demodulator 120 in an embodiment.

Information useful for managing power consumption can be categorized into types: a first type of information that can change fast, frequently, or both fast and often, and a second type of information that—relative to the first type of information—tends to change, if at all, infrequently, and/or slowly, or is static. An example of a signal that can change fast or frequently is the P_SYS signal, which represents total power output of a PSU. This is because the power that a PSU supplies to a computing device depends on the workload of the device, which can vary often and rapidly. Examples of signals that tend to change slowly or are static include: PSU parameter information, PSU environmental information, component health information, and PSU historical data. Examples of PSU parameter information include a maximum power rating, e.g., wattage, a model number, a capability of the PSU to exceed its maximum power rating for short duration, or any other PSU specification. Examples of environmental information include an ambient temperature or an interior temperature of the PSU, or an AC power quality parameter. Examples of component health information include a fan wear or fan clog state warning, or a service schedule time. Examples of PSU historical data include an average or peak power consumption statistic. It should be appreciated that these examples of information that change slowly, infrequently, or which are static that are presented herein do not represent an exhaustive list.

Embodiments contemplate that any type of information that can change fast, frequently, or both fast and often may be information of the first type. It should be appreciated that while information of the first type is capable of changing frequently, it does not always change frequently. Embodiments contemplate that any type of information that typically changes infrequently or slowly—relative to the first type of information, or is static may be information of the second type. Because data useful for power management can change at different frequencies, it may be beneficial to monitor the first and second types of information at different time intervals.

As used herein, the term "frequently changing information" refers to the first type of information and "infrequently changing or static information" refers to the second type of information. In various embodiments, the first type of information is monitored at a first frequency and the second type of information is monitored at a second frequency, wherein the first frequency is greater than the second frequency.

In various embodiments, frequently changing information may change as often as once per second once per millisecond, or more frequently. Frequently changing information may be static for extended periods, e.g., when a device is idle. In some embodiments, frequently changing information is monitored at least once per millisecond. In some embodiments, the first type of information comprises a real-time, substantially continuous analog telemetry signal representing total power output of PSU. Power output telemetry information may change rapidly with changes in work load of a computer system, but may change slowly or be static during system idle periods. In various embodiments, Power output telemetry information is monitored once per second, once per millisecond, or more frequently.

In various embodiments, infrequently changing or static information does not change more often than once per second or once per 5 second period. In some embodiments, infrequently changing or static information does not change more often than once per minute. In various embodiments, infrequently changing or static information is monitored once per second or once per 5 second period. In various embodiments, infrequently changing or static information is monitored once per minute.

In some embodiments, the microcontroller of VR unit 118 or processor 106 execute instructions or include circuitry that recognizes that information is being transmitted on pin 5 in a time period during which PSU 102 is not fully operational, and which receives the information. The instructions may be embodied in Pcode, BIOS, a driver, or other code.

In some embodiments, the device 100 may comprise demodulator 120, which demodulates a modulated signal that is overlaid on pin 5. As mentioned, in some embodiments, VR unit 118 performs the demodulation function. For example, in some embodiments, PSU 102 overlays a digitally modulated signal on pin 5 in a way that does not interfere with the P_SYS signal. In embodiments, the digitally modulated signal comprises information that facilitates management of power consumption of device 100. In embodiments, a single channel for communication of two or more signals comprises pin 5. The information that is in addition to the P_SYS signal may be provided by demodulator 120 to any of Pcode 130, BIOS 132, driver 134, or to VR unit 118.

PSU 102 of device 100 comprises sensor 123, communication circuitry 124, system monitor 125, and fan 115. Sensor 123 measures power consumed by system 100 via connector 126. In embodiments, sensor 123 measures an input power to the device 100, which may be a total power consumed by the device 100. The power measured by the sensor 123 may also be referred to as platform power, total DC system power, total system power, platform input power, and/or the like. In the example of FIG. 1, the sensor 123 may measure the power supplied by the PSU 102. In some embodiments, any appropriate type of sensors 123 may be used. In embodiments, fan 115 may be monitored by system monitor 125, VR unit 118, or processor 106.

In some embodiments, communication circuitry 124 may comprise circuitry that determines first information to be communicated on pin 5 in a time period during which PSU 102 or system 100 is not fully operational. In some embodiments, communication circuitry 124 may comprise circuitry that determines second information to be communicated by overlaying a digitally modulated signal on pin 5. Communication circuitry 124 may comprise circuitry that transmits the first information, the second information, or both. In some embodiments, communication circuitry 124 comprises circuitry for receiving a request for information.

The device 100 may comprise Pcode 130, basic input/output system (BIOS) 132, and one or more drivers 134. Pcode 130, BIOS 132, and drivers 134 may be stored in any of memories 108. Pcode 130, BIOS 132, and drivers 134 comprise machine-readable instructions. All of part of these instructions may be copied to processor 106 where the instructions may be executed by the processor. In some embodiments, the microcontroller integrated in VR unit 118 executes machine-readable instructions stored in any of the memories 108. The instructions contained in Pcode 130, BIOS 132, and drivers 134, when executed by processor 106 or by another controller, may perform various operations for managing power consumed by device 100.

Figure 2:
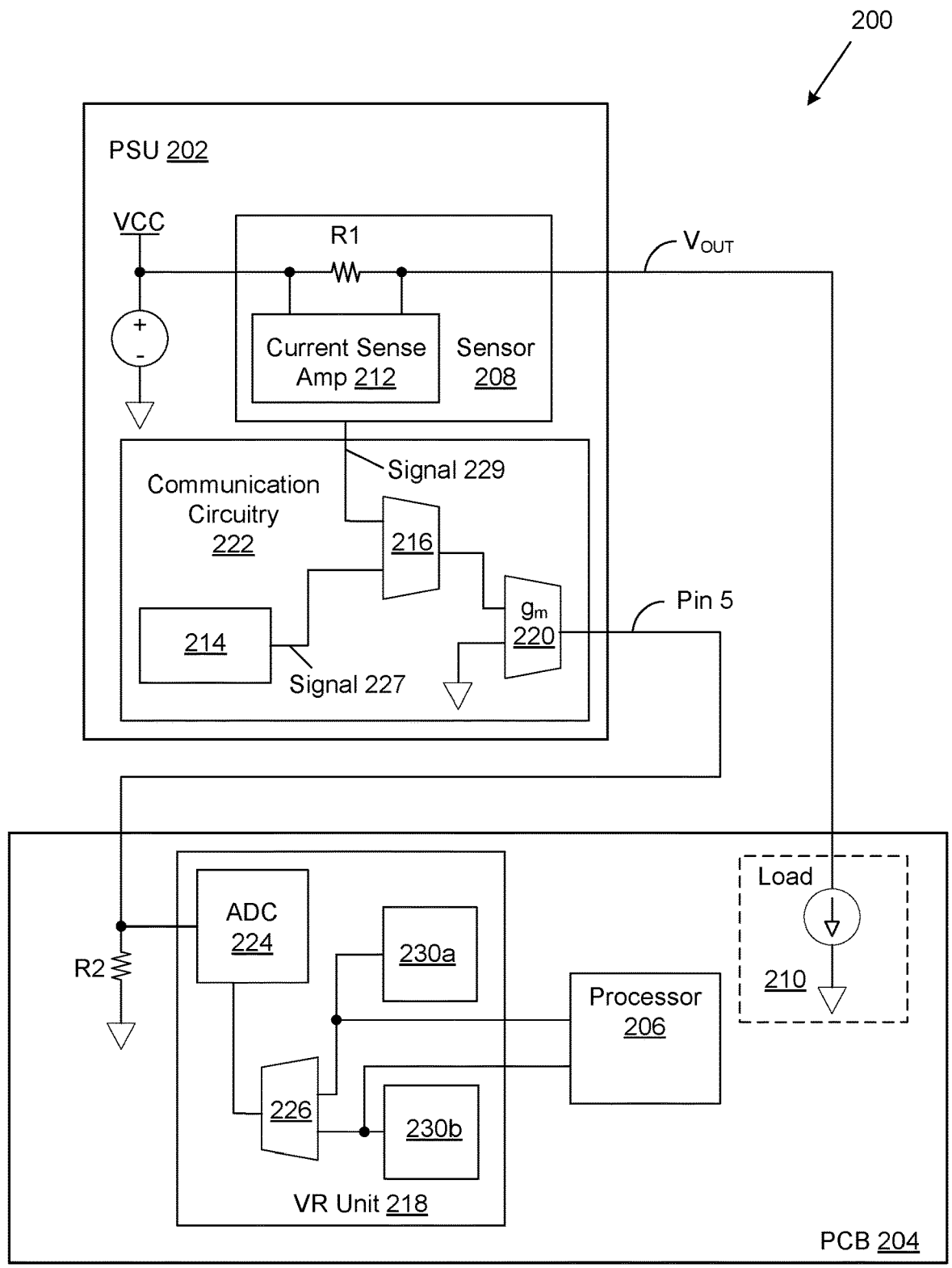
FIG. 2 is a functional block diagram illustrating elements of a computing system providing power supply communications via a shared channel for performance management in accordance with some embodiments

FIG. 2 is a functional block diagram illustrating elements of a computing system providing power supply communications via a shared channel for performance management in accordance with some embodiments. FIG. 2 shows a computing device 200 illustrating examples of implementation details of computing device 100 according to some embodiments. Computing device 200 enables a PSU to communicate more than one type of data over a single wire to a controller, processor, or other device managing power consumption performance or performing other functions, according to some embodiments.

Although the device 200 may comprise multiple processors or SoCs, multiple memories, VRs, fans, a socket, connector, and other components, the example of FIG. 2 omits these components for purposes of illustrative clarity.

The device 200 may comprise a PSU 202, a PCB 204, VR unit 218, and a processor 206. The PSU 202 comprises sensor 208, communication circuitry 222, and a voltage output $V_{OUT}$. The processor 206 and VR unit 218 may be disposed on PCB 204.

The device 200 complies with a power supply design standard, such as the example standard shown in FIG. 1 and Table 1. While device 200 comprises a 10-pin connector, for clarity of illustration only pin 5 and a composite of DC power signals on pins 8-10 ($V_{OUT}$) are shown in FIG. 2. VCC, shown in FIG. 2, represents an external power source. Load 210, shown in FIG. 2, represents the power used by device 200.

Device 200 comprises sensor 208 and communication circuitry 222. Sensor 208 comprises a current sense amplifier 212 and a resistor R1. Communication circuitry 222 comprises circuitry 214, input selecting circuitry 216, and transconductance amplifier 220.

Current sense amplifier 212 measures total DC power generated by the PSU 102, and converts the measurement to a current proportional analog signal 229, which is provided to one of the inputs of input selecting circuitry 216. In an embodiment, signal 229 is limited to a finite range, e.g., 0-1500 µA. In an embodiment, signal 229 is the P_SYS signal. While the signal 229 output from current sense amplifier 212 is provided to an input of input selecting circuitry 216 in FIG. 2, in other embodiments, the signal 229 may be provided directly to transconductance amplifier 220. In this alternative, the output of the transconductance amplifier 220 is provided to one of the inputs of input selecting circuitry 216 and the output of input selecting circuitry 216 is provided on pin 5.

Circuitry 214 determines information of the second type and transmits the information on its output, as signal 227. In embodiments, the information is represented in digital in form and converted into an analog signal for transmission. To accomplish the conversion, circuitry 214 may include a digital-to-analog converter (DAC) in some embodiments. The particular information determined by circuitry 214 can comprise any of environmental information, component health information, PSU parameter information, and PSU historical data. Circuitry 214 may determine information of the second type by accessing data stored in a memory or by obtaining data from a sensor. In some embodiments, circuitry 214 comprises a memory or an appropriate sensor. For example, circuitry 214 may determine the maximum power (wattage) rating of the PSU by fetching a digital value from a memory indicating that the PSU is rated at 600 W. In one embodiment, circuitry 214 may convert the binary word into a voltage that is proportional to the binary word. In other embodiments, the binary word may be converted to a current. Circuitry 214 may present signal 227 as a voltage corresponding with the digital value of the wattage rating on its output.

Circuitry 214 is not limited to determining a maximum power of the PSU. In various embodiments, circuitry 214 may determine any type of infrequently changing or static information. In some embodiments, circuitry 214 determines and transmits a single information item, e.g., maximum power rating. In other embodiments, circuitry 214 determines and transmits two or more information items, e.g., maximum power rating and a capability of the PSU to exceed its maximum power rating for short duration.

Input selecting circuitry 216 comprises two inputs and an output. Input selecting circuitry 216 determines which of the signals on its inputs to transmit on its output to transconductance amplifier 220. In various embodiments, input selecting circuitry 216 selects signal 229 during normal operation of device 200, e.g., when processor 206 is capable of executing instructions, or during other active states of device 200. In various embodiments, input selecting circuitry 216 selects signal 227 during a particular time period of device 200, e.g., a transition from a sleep or off state to an active state. In some embodiments, the input selecting circuitry 216 selects signal 227 during a predetermined time period, e.g., an initial period of active state operation of device 200 "Tcomm." In one embodiment, Tcomm is 500 milliseconds. In some embodiments, signal 227 may include a preamble portion indicating the start of transmission of an information portion of the signal, an appendix portion indicating the end of transmission of the information portion of the signal, or both a preamble and an appendix.

In the example of FIG. 2, PSU 202 includes input selecting circuitry 216. However, it is not essential that PSU 202 include input selecting circuitry 216. The input selecting circuitry 216 is used to ensure that signal 229 and signal 227 do not interfere with one another. However, because the signals 229 and 227 should only be present on pin 5 at different times, input selecting circuitry 216 may be omitted in some embodiments.

Transconductance amplifier 220 amplifies the selected input signal 227 or 229 and outputs a signal on pin 5, which may be a current proportional analog signal. In embodiments, transconductance amplifier 220 converts analog voltage signals 227, 229 into analog current signals. The signal on pin 5 need not be a current-mode signal. In some embodiments, transconductance amplifier 220 may be omitted and the signal on pin 5 may be an analog voltage signal.

VR unit 218 comprises ADC 224, output selecting circuitry 226, power management circuitry 230a, and power management circuitry 230b.

In some embodiments, the signal received by VR unit 218 on pin 5 may be an analog signal. During times of normal operation, the signal may be an analog signal corresponding with information of the first type, e.g., an analog signal that is proportional to the real-time power provided by PSU 202. During particular or predetermined time periods the signal received by VR unit 218 on pin 5 may be an analog signal that is proportional to a digital value corresponding with information of the second type. In some embodiments, the signal output by transconductance amplifier is a current, which is converted to a voltage by resistor R2. Regardless of whether signal output on pin 5 corresponds with information of the first type, e.g., an analog signal proportional to total DC power generated by the PSU, or a signal that corresponds with information of the second type, an analog signal proportional to a digital value associated with particular power management information, the signal may be converted to digital form by an ADC 224.

The power management circuitries 230a, 230b may be two components of single power management circuitry. In some embodiments, power management circuitries include a controller to execute machine-readable instructions. Power management circuitry 230a is operable to receive a real-time, substantially continuous analog telemetry signal representing total power output of PSU 202, e.g., the P_SYS signal. In various embodiments, power management circuitry 230a uses the received total power output signal to manage power consumption of device 200 during normal operation, e.g., active states, of device 200.

In various embodiments, power management circuitry 230b is operable to receive information of the second type, e.g., any infrequently changing or static information. Power management circuitry 230b is operable to receive power management information of the second type during a particular time period of device 200, e.g., a transition from a sleep or off state to an active state, or during a predetermined time period, e.g., a period at the initial active state operation of device 200. Power management circuitry 230b uses the received information to manage power consumption of device 200.

Output selecting circuitry 226 comprises one input and two outputs. Output selecting circuitry 226 determines which of the outputs to transmit its input on based on the type of signal received on the input. In various embodiments, output selecting circuitry 226 selects the output coupled to power management circuitry 230a during normal operation of device 200, e.g., when processor 206 is capable of executing instructions, or during other active states of device 200. In various embodiments, output selecting circuitry 226 selects the output coupled to power management circuitry 230b during a particular time period of device 200, e.g., a transition from a sleep or off state to an active state. In some embodiments, output selecting circuitry 226 selects the output coupled to power management circuitry 230b during a predetermined time period. In some embodiments, output selecting circuitry 226 is operable to detect a preamble portion or an appendix portion of an information transmission and use the preamble, appendix, or both to define a time period for receiving information of the second type.

In the example of FIG. 2, VR Unit 218 includes output selecting circuitry 226. However, it is not essential that VR Unit 218 include output selecting circuitry 226. The output selecting circuitry 226 is used to ensure that the analog telemetry signal representing total power output of PSU 202 does not interfere with power management information communicated from circuit 214. However, because the analog telemetry signal and the power management information should only be present on pin 5 at different times, output selecting circuitry 226 may be omitted in some embodiments.

In some embodiments, one or more functions of power management circuitry 230a, 230b may be performed by processor 206, e.g., by processor 206 executing Pcode. In these embodiments, processor 206 receives the real-time, substantially continuous analog telemetry signal representing total power output of PSU 202, e.g., the P_SYS signal. Processor 206 may receive the total power output signal during normal operation of device 200. Processor may also receive during a particular or predetermined time period any infrequently changing or static information. In embodiments, processor 206 performs any of the functions described herein that output selecting circuitry 226 may perform.

Figure 3:
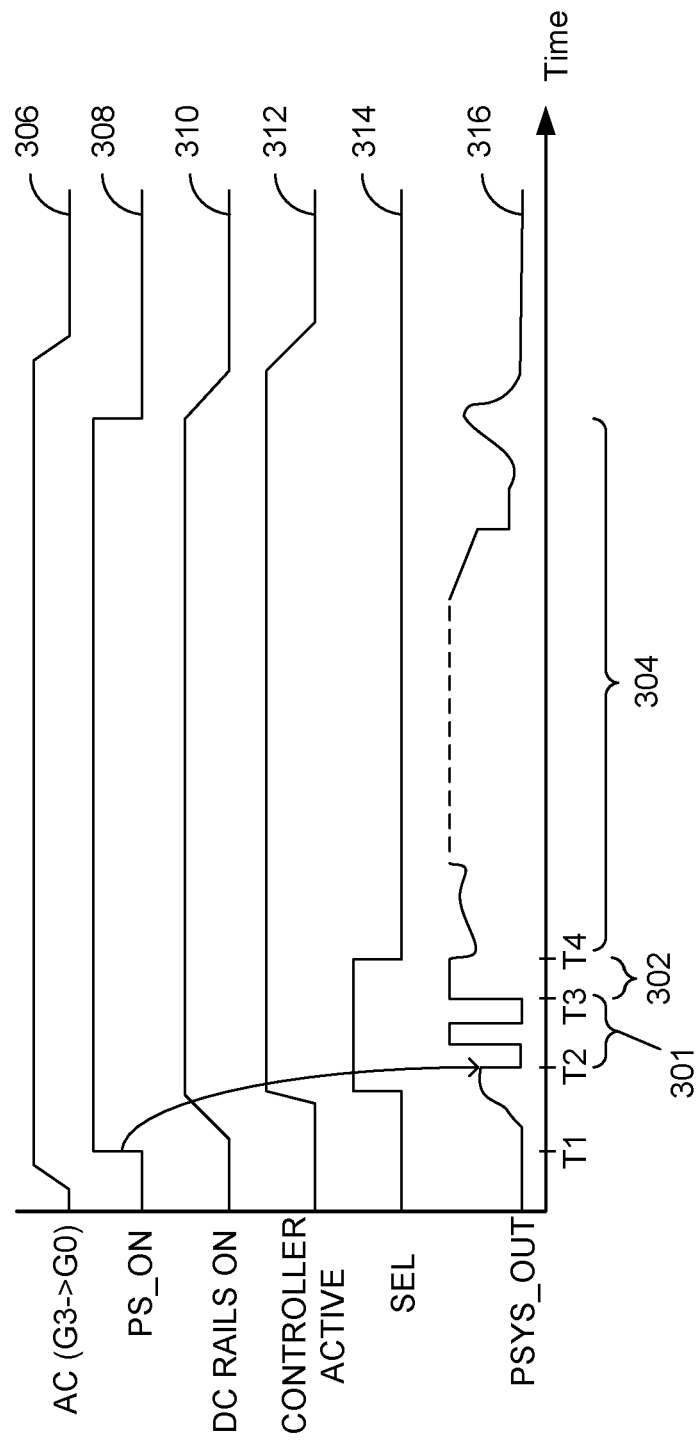
FIG. 3 is a diagram illustrating timing relationships for some example signals for communicating more than one type of data during particular or predetermined time periods.

FIG. 3 is a diagram illustrating timing relationships for some example signals for communicating more than one type of data during particular or predetermined time periods. As signal 306 shows, a device, e.g. device 200, transitions from an off state to a working or active state at a time immediately prior to time T1. Signal 308 at time T1 illustrates the on/off state of a PSU, e.g. PSU 202. In an embodiment, signal 308 can be PS_ON. Signal 310 represents the state of a power signal. In an embodiment, signal 310 can be the states of pins 8-10 in the example power supply design specification of Table 1. In the example of FIG. 3, signal 310 is asserted shortly after the PSU turns on, i.e., PS_ON active. Signal 310 represents the state of a microcontroller, either a controller integrated in a VR unit, e.g., VR unit 118 or 218, or a standalone microcontroller or other power management circuitry. Subsequent to a PSU entering an on state, signal 312 is asserted, indicating the PSU is in an active state. Signal 314 relates to output selecting circuitry 226. Signal 314 represents which output of the output selecting circuitry 226 will receive the signal on the circuitry's input. In the example of FIG. 3, at a time prior to T2, signal 314 is asserted to select a first output. At time T4, signal 314 is de-asserted to select the other output.

In various embodiments, signal 314 is asserted so as to select an output coupled to power management circuitry 230b during a particular or predetermined time period for receiving information of the second type. For example, the particular or predetermined time period may comprise the time period from T2 to T4. In embodiments, the particular or predetermined time period may extend prior to or subsequent to the time period from T2 to T4, e.g., to allow for set up of another signal, such as P_SYS. In various embodiments, signal 314 is asserted during the time period from T2 to T4 so as to select an output coupled to circuitry operable to receive any infrequently changing or static information.

In various embodiments, signal 314 is de-asserted so as to select an output coupled to power management circuitry 230a during a time period for receiving information of the first type, e.g., time period 304. In various embodiments, the time period 304 comprises time periods that are outside the particular or predetermined time period when infrequently changing or static information is transmitted (information of second type. In various embodiments, signal 314 is de-asserted during these time periods, e.g., time period 304, so as to select an output coupled to circuitry operable to receive a real-time, substantially continuous analog telemetry signal representing total power output of PSU 202, e.g., the P_SYS signal. In various embodiments, signal 314 is de-asserted during these time periods so as to select an output coupled to circuitry operable to receive information of the first type.

In the example of FIG. 3, signal 316 is the P_SYS_OUT signal. As shown in the figure, the example signal 316 includes a preamble portion 301 in the time period from T2 to T3. During a preamble, signal 316 may be pulsed low and high a predetermined number of times. In addition, the voltage levels corresponding with low and high signals, as well as the length of the pulses may be predetermined. In the example, signal 316 is pulsed low twice and high once. The pulse pattern during a preamble can indicate the type of information to be communicated, with different preambles used to convey different types of information.

As shown in the example of FIG. 3, signal 316 includes a message portion in the time period 302 from T3 to T4. During the message portion, the signal 316 is held a predetermined level for a predetermined duration corresponding with the power management information contained in the message. In embodiments, signal 316 may be current or a voltage, and may correspond with a digital value. As an example, signal 316 may be held from T3 to T4 at 25 µA to indicate a PSU rating of 25 W. Additional examples are set forth in Table 2.

TABLE 2

| Digital Value | Signal Level | Information (PSU Rating) |
| --- | --- | --- |
| 0000 | 25 µA | 25 W |
| 0001 | 50 µA | 50 W |
| 0010 | 100 µA | 100 W |
| 0011 | 150 µA | 150 W |
| 0100 | 200 µA | 200 W |
| 0101 | 250 µA | 250 W |
| 0110 | 300 µA | 300 W |
| 0111 | 350 µA | 350 W |

While the example of FIG. 3 depicts a signal 316 having a single message portion, it should be appreciated that signal 316 may comprise two or more message portions containing a respective number of information items in various embodiments. In addition, while Table 2 presents, four possible values for an information item and a corresponding level of signal, any number of values may be provided in other embodiments, subject to any constraint in the transmitter or receiver. For example, a microcontroller or power management circuitry may have an input limit to a certain scale. In an embodiment, a maximum range of current is zero to 1500 µA and the number of signal levels would need to fit within this range. In an embodiment, the period from T1 to T4 may be an initial active state operation of device 200, e.g., Tcomm. While the example of FIG. 3 depicts a preamble portion 301 from T2 to T3 and a message portion 302 from T3 to T4, in other embodiments, preamble portion 301 and message portion 302 can be at other times. While the example of FIG. 3 depicts a preamble portion 301, in some embodiments, preamble portion 301 may be omitted. While the example of FIG. 3 does not show an appendix portion, in some embodiments, an appendix portion may be provided immediately following message portion 302.

Figure 4:
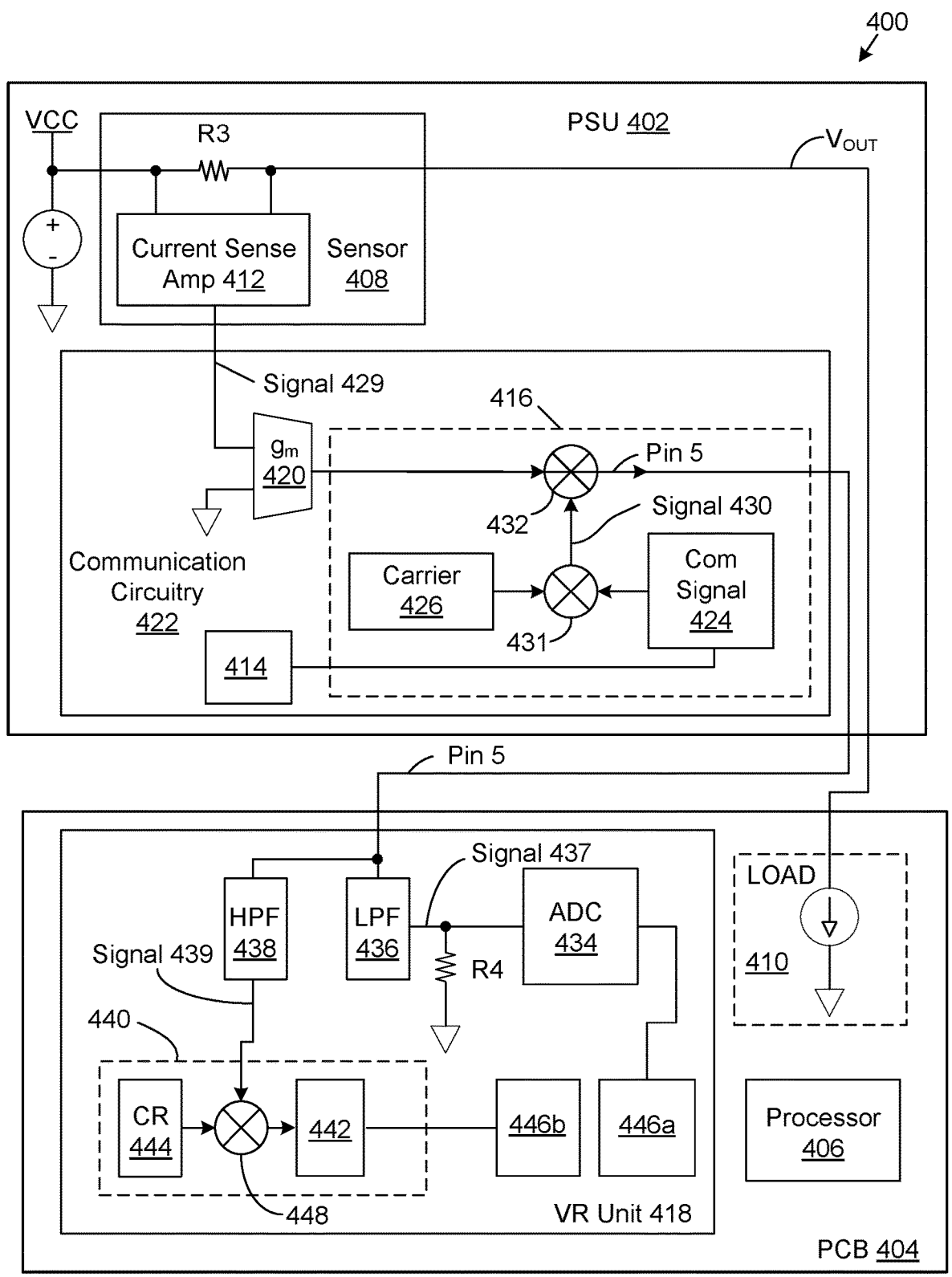
FIG. 4 is a functional block diagram illustrating elements of a computing system providing power supply communications via a shared channel for performance management in accordance with some embodiments.

FIG. 4 is a functional block diagram illustrating elements of a computing system providing power supply communications via a shared channel for performance management in accordance with some embodiments. FIG. 4 shows a computing device 400 illustrating examples of implementation details of computing device 100. Computing device 400 enables a PSU to communicate more than one type of data over a single wire to a controller, processor, or other device managing power consumption or performing other functions, according to some embodiments.

Although the device 400 may comprise multiple processors or SoCs, multiple memories, VRs, fans, a socket, connector, and other components, the example of FIG. 4 omits these components for purposes of illustrative clarity.

The device 400 may comprise a PSU 402, a PCB 404, a VR unit 418, and a processor 406. The PSU 402 comprises sensor 408, communication circuitry 422, and a voltage output $V_{OUT}$. The processor 406 and the VR unit 418 may be disposed on PCB 404.

In various embodiments, the device 400 complies with a power supply design standard, such as the example standard shown in FIG. 1 and Table 1. While device 400 comprises a 10-pin connector, for clarity of illustration only pin 5 and a composite of DC power signals on pins 8-10 ($V_{OUT}$) are shown in FIG. 4. VCC, shown in FIG. 4, represents an external power source. Load 410, shown in FIG. 4, represents the power used by device 400.

The PSU 402 comprises sensor 408 and communication circuitry 422. Sensor 408 comprises a current sense amplifier 412 and a resistor R3. Communication circuitry 422 comprises circuitry 414, modulation circuitry 416, and transconductance amplifier 420. Modulation circuitry 416 comprises communication signal circuitry (Com Signal) 424, carrier 426, mixer 431, and mixer 432.

Current sense amplifier 412 measures total DC power generated by the PSU 102, and converts the measurement to an analog signal 429, which is provided to transconductance amplifier 420. Transconductance amplifier 420 amplifies signal 429 and outputs the amplified current proportional signal to mixer 432. In embodiments, signal 429 may vary in a relatively low range of frequencies in comparison to ranges of frequencies generated by communication signal circuitry 424 and carrier 426. In embodiments, analog signal 429 can change at a relatively high frequency in comparison to other power management information, e.g., information of the second type. For example, signal 429 can change between in a range 2 kHz between 10 kHz, while signals generated by communication signal circuitry 424 and carrier 426 may be on the order of 100s kHz and above. It should be appreciated that signal 429 is not limited to the range of 2-10 kHz, and may be sampled at any frequency that provides sufficient separation from the signals generated by communication signal circuitry 424 and carrier 426.

Circuitry 414 determines particular information, e.g., information of the second type, and provides the information to communication signal circuitry 424. The particular information determined by circuitry 414 can comprise any infrequently changing or static information. In embodiments, this information is in digital form. In embodiments, information of the second type, i.e., infrequently changing or static information, changes at a relatively low frequency in comparison to a frequency at which information of the first type, e.g., power consumption information, may change. For example, in embodiments, information of the second type determined by circuitry 414 does not change more often than once per 5 second period, while information of the first type can change once per second (1 Hz) or more frequently.

In embodiments, circuitry 414 may determine the maximum power rating of the PSU and present a digital value corresponding with the wattage rating to circuitry 424. However, circuitry 414 is not limited to determining a maximum power of the PSU. In various embodiments, circuitry 414 may determine a model number or any other PSU specification. In various embodiments, circuitry 414 may determine an AC power quality parameter, a fan wear or clogging state, an ambient temperature, an interior temperature of the PSU, a service schedule time, a capability of the PSU to exceed its maximum power rating for short duration, or a historical power consumption statistic, e.g., average power. Circuitry 414 may determine particular information by accessing data stored in a memory or by obtaining data from a sensor. In some embodiments, circuitry 414 comprises a memory or an appropriate sensor. In some embodiments, circuitry 414 determines and communicates a single information item to communication signal circuitry 424, e.g., maximum power rating. In other embodiments, circuitry 414 determines and communicates two or more information items, e.g., maximum power rating and a capability of the PSU to exceed its maximum power rating for short duration.

In some embodiments, circuitry 414 determines and communicates an information item to communication signal circuitry 424 during an initial active state of operation of device 400. However, circuitry 414 is not limited to communicating information only during an initial active state. In embodiments, circuitry 414 may communicate an information item at any time device 400 is in an active state. For example, circuitry 414 may determine that a temperature value has exceeded a threshold and may communicate this information at the time the threshold is exceeded, which may be at a time other than the initial active state.

In some embodiments, circuitry 414 initiates a communicates an information item to communication signal circuitry 424 independently of VR Unit 418, a controller, or processor 406. However, in some embodiments, circuitry 414 initiates a communicates an information item in response to a request from VR Unit 418, a controller, or processor 406. Accordingly, while not shown in FIG. 4, in some embodiments, circuitry 414 comprises various components required to receive a request. For example, in some embodiment circuitry 414 comprises carrier recovery circuitry, a mixer, integrator circuitry, and other signal processing components for receiving a modulated signal.

Communication signal circuitry 424 receives one or more information items from circuitry 414, which may be any infrequently changing or static information, which may be in digital form, and converts the information item or items to an information signal, which is input to communication signal circuitry 424. Carrier signal circuitry 426 inputs a carrier signal to mixer 431. In embodiments, communication signal circuitry 424 and carrier 426 generate signals in relatively high ranges of frequencies as compared with signal 429. The output of mixer 431 is signal 430, which comprises a carrier signal modulated with an information signal, the information signal comprising one or more of the information items provided by circuitry 414. Signal 430 may be 100 kHz or higher. In some embodiments, signal 430 may in a range from the high hundreds of kHz to the low MHz. The output of mixer 431 is input to mixer 432. Mixer 432 mixes with, or overlays on, signal 430 the amplified version of signal 429 from transconductance amplifier 420, and outputs a signal on pin 5. In some examples, the signal output on pin 5 may be referred to as a modulated P_SYS signal. In some examples, the signal output on pin 5 conforms to the example power supply specification of Table 1 and FIG. 1.

In various embodiments, the signal produced by carrier 426 may be modulated using any suitable digital modulation technique including, but not limited to, amplitude modulation (AM), phase modulation (PM), frequency modulation (FM), or any other suitable digital modulation technique. Examples of AM techniques include amplitude-shift keying (ASK) and quadrature amplitude modulation (QAM). Examples of PM techniques include phase-shift keying (PSK) modulation, e.g., binary PSK (BPSK) and quadrature PSK (QPSK). Examples of FM techniques include frequency shift keying (FSK) and multiple frequency shift keying (MFSK). As different modulation techniques each have respective trade-offs in terms of power requirements, bandwidth efficiency, any technique suitable for a particular application may be employed.

The VR unit 418 comprises low pass filter (LPF) 436, high pass filter (HPF) 438, ADC 434, demodulation circuitry 440, power management circuitry 446a, and power management circuitry 446b. In embodiments, the power management circuitries 446a, 446b may be two components of single power management circuitry.

In the example embodiment shown in FIG. 4, VR unit 418 receives the signal on pin 5, e.g., a modulated P_SYS signal. The signal on pin 5 is input to LPF 436, which outputs signal 437. In embodiments, LPF 436 recovers signal 429 as signal 437. As such, in some embodiments, signal 437 may be an analog signal that is proportional to the real-time power provided by PSU 402. In embodiments, signal 437 is a signal that can change in a range 2 kHz between 10 kHz, however, the signal 437 is not limited to this range. In various embodiments, LPF 436 may pass frequencies that are one-half to the sample frequency, which can be the 2-10 kHz range, or greater, depending on the implementation. In some embodiments, the analog signal 437 output by LPF 436 may be converted to an analog voltage by resistor R4 and converted to a digital form by an ADC 434.

In the example embodiment shown in FIG. 4, the signal on pin 5 is also input to HPF 438, which outputs signal 439. HPF 438 recovers signal 430 as signal 439, which is input to demodulation circuitry 440. In embodiments, signal 439 can have a frequency in the range of 100s of kHz to low MHz, or greater.

Signal 439 is input to mixer 448. Carrier recovery 444 circuitry also inputs a signal to mixer 448. Mixer 448 provides its output to integrator 442, which provides a transmitted information item to power management circuitry 446b. In various embodiments, other signal processing components for receiving a modulated signal may be included in demodulation circuitry 440. In an embodiment, HPF 438 may pass frequencies above 10 kHz, 15 kHz, 20 kHz, or greater.

In the example of FIG. 4, VR Unit 418 only receives modulated information items when the information is sent to the unit. However, in other embodiments, VR unit 418 may request an information item from PSU 402. Accordingly, while not shown in FIG. 4, in some embodiments, VR Unit 418 comprises various components required to transmit a request. For example, in some embodiments circuitry 414 comprises components of modulation circuitry, such as carrier circuitry 426, com signal 424, and mixer 431.

The modulation circuitry 416 and demodulation circuitry 440 are examples. It should be appreciated that modulation circuitry 416 is not limited to the example shown in the figure. Nor is demodulation circuitry 440 limited to the example shown in the figure. Any suitable modulation or demodulation circuitry may be employed in various embodiments. For example, in some embodiments, modulation circuitry 416, demodulation circuitry 440, or both may include a digital signal processor (DSP).

Power management circuitry 446a is operable to receive information of the first type, e.g., a real-time, substantially continuous analog telemetry signal representing total power output of PSU 402, e.g., the P_SYS signal. In an embodiment, power management circuitry 446a uses the received total power output signal to perform one or more functions, which may be related to managing power consumption of device 400 during normal operation, e.g., active states, of device 400.

In various embodiments, power management circuitry 446b is operable to receive information of the second type, e.g., any infrequently changing or static information. Power management circuitry 446b is operable to receive information of this type at any time the VR Unit 418 is operating in a normal operating mode. In embodiments, power management circuitry 446b is operable to detect transmission of signal 439 when in a sleep mode, and in response to detecting the signal, wake up and enter the normal operating mode.

In some embodiments, one or more functions of power management circuitry 430a, 430b may be performed by processor 406, e.g., by processor 406 executing Pcode. In these embodiments, processor 406 receives receive information of the first type, e.g., the real-time, substantially continuous analog telemetry signal representing total power output of PSU 402, e.g., the P_SYS signal. Processor 406 may receive signals conveying information of the first type during normal operation of device 400. In addition, processor 406 may also receive information of the second type, e.g., any infrequently changing or static information at any time during normal operation of device 400.

While FIG. 4 shows LPF 436 and HPF 438 included within VR unit 418, this is not required. In some embodiments, LPF 436 or HPF 438, or both may be discrete components or integrally included with another part. While FIG. 4 shows modulation circuitry 416 included in PSU 402 and demodulation circuitry 440 included within VR unit 418, this is not required. In some embodiments, modulation circuitry 416 or demodulation circuitry 440, or both may be discrete components. Either modulation circuitry 416 or demodulation circuitry 440 may be integrally included with another part.

Figure 5:
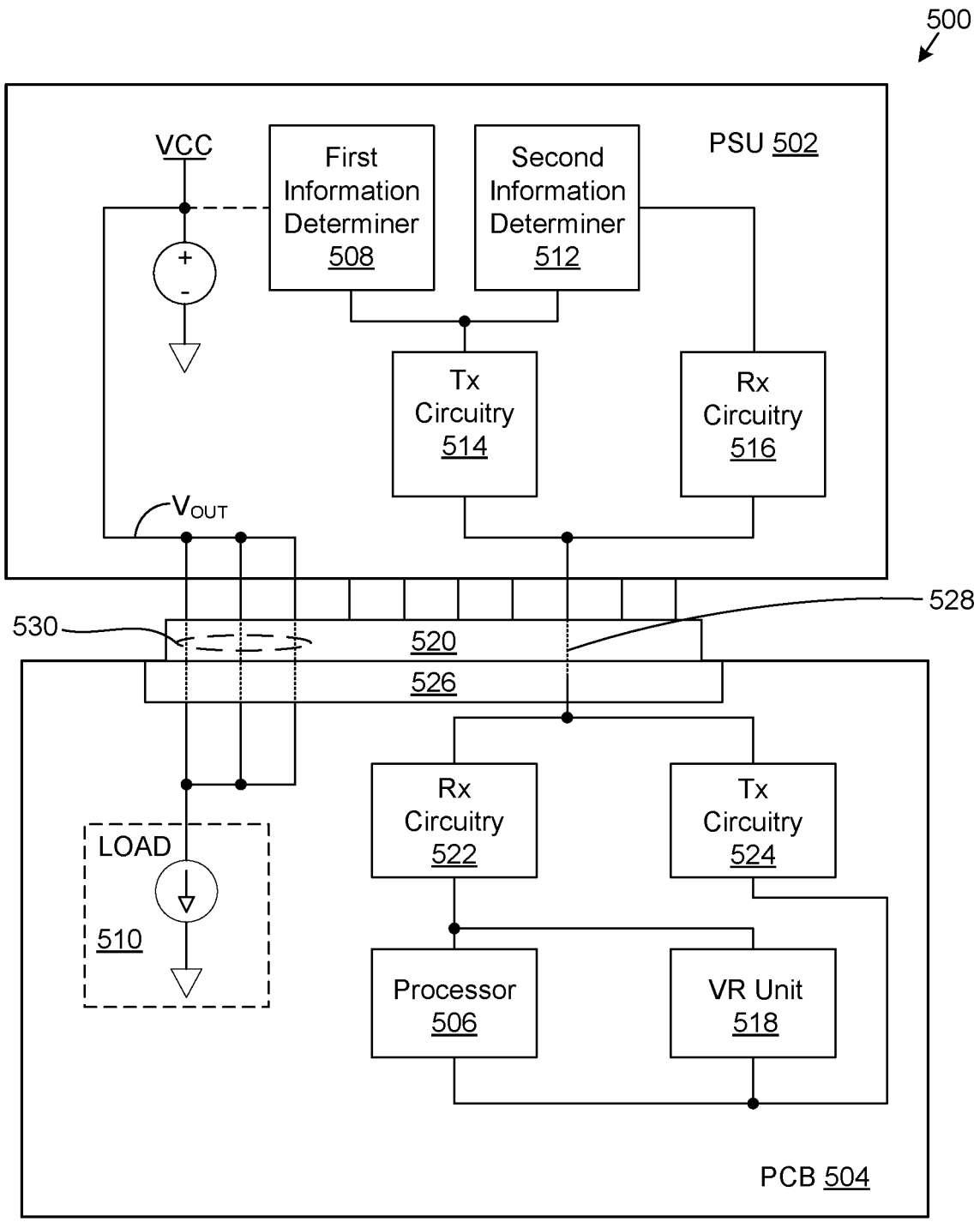
FIG. 5 is a functional block diagram illustrating elements of a computing system providing power supply communications via a shared channel for performance management in accordance with some embodiments.

FIG. 5 is a functional block diagram illustrating elements of a computing system providing power supply communications via a shared channel for performance management in accordance with some embodiments. FIG. 5 shows a computing device 500 illustrating examples of implementation details of computing device 100 according to some embodiments. Computing device 500 enables a PSU to communicate more than one type of data over a single wire to a controller, processor, or other device managing power consumption performance or performing other functions, according to some embodiments.

Although the device 500 may comprise multiple processors or SoCs, multiple memories, VRs, fans, a socket, connector, and other components, the example of FIG. 5 omits these components for purposes of illustrative clarity.

The device 500 may comprise a PSU 502 and a PCB 504. The PSU 202 comprises first information determiner 508, second information determiner 512, transmit (Tx) circuitry 514, receive (Rx) circuitry 516, a voltage output $V_{OUT}$, and a hardware interface comprising connector 520. A variety of components are disposed on PCB 204. As shown in FIG. 5, a processor 506, a VR unit 518, receive (Rx) circuitry 522, and transmit (Tx) circuitry 524 may be disposed on PCB 204 along with other components, which have been omitted for illustrative clarity. A hardware interface comprising socket 526 is also disposed on PCB 204.

In various embodiments, the device 500 complies with a power supply design standard, such as the example standard shown in FIG. 1 and Table 1. VCC, shown in FIG. 5, represents an external power source. Load 510, shown in FIG. 5, represents the power used by device 500.

The power supply design standard comprises a pin-out definition. According to the pin-out definition, one of the pins is dedicated to communicating information of the first type. In the example of FIG. 5, pin 528 is dedicated to communicating information of the first type. In some embodiments, pin 528 is associated with P_SYS, which is an analog signal 5 that is proportional to the real-time power provided by PSU 502. In the example of FIG. 5, pins 530 are each assigned to carry a 12V DC power signal.

First information determiner 508 comprises circuitry for determining information of the first type. In some embodiments, first information determiner 508 comprises a sensor for measuring an input power to the device, e.g., determining the P_SYS signal. Second information determiner 512 comprises circuitry for determining information of the second type. Second information determiner 512 may access data stored in a memory, e.g., a maximum power rating or other PSU parameter, or by obtaining data from a sensor, e.g., a temperature sensor. Transmit circuitry 514 comprises circuitry for communicating information items. In embodiments, transmit circuitry 514 includes circuitry to transmit a substantially continuous analog signal corresponding with information of the first type on pin 528. In embodiments, transmit circuitry 514 also includes circuitry to modulate a signal corresponding with information of the second type and to overlay the modulated signal on pin 528 on top of the substantially continuous analog signal corresponding with information of the first type. In embodiments, transmit circuitry 514 comprises communication signal circuitry, carrier circuitry, mixer circuitry, and transconductance amplifier circuitry. Receive circuitry 516 comprises circuitry for receiving requests for information of the second type and communicating the request to second information determiner 512. For example, receive circuitry 516 may receive a request for a maximum power rating for short duration of a PSU. In response to a request for information of the second type, second information determiner 512 determines the requested information and transmit circuitry 514 transmits the requested information.

In embodiments, receive circuitry 522 on PCB 204 comprises circuitry to receive first and second information of the first and second types, respectively, and to identify the first information and the second information. In some embodiments, to receive information of the first type, receive circuitry 522 may include a low pass filter, a resistor to convert an analog current signal to a voltage signal, and an ADC. In some embodiments, to receive information of the first type, receive circuitry 522 may include a high pass filter, carrier recovery circuitry, mixer circuitry, and integration circuitry. In embodiments, transmit circuitry 524 disposed on PCB 204 comprises circuitry to send, via pin 528, a request for information of the second type. For example, transmit circuitry 524 may send a request to PSU 502 to receive a maximum power rating for short duration of the PSU.

Processor 506 is coupled with receive circuitry 522 so that it can receive information of the first type and information of the second type. Processor 506 is also coupled with transmit circuitry 524 so that it can request information of the second type. Similarly, VR unit 518 is coupled with receive circuitry 522 so that it can receive information of the first type and information of the second type. VR unit 518 is also coupled with transmit circuitry 524 so that it can request information of the second type. Processor 506 and VR unit 518 may use information of the first and second types to manage power consumption and for other purposes.

Figure 6:
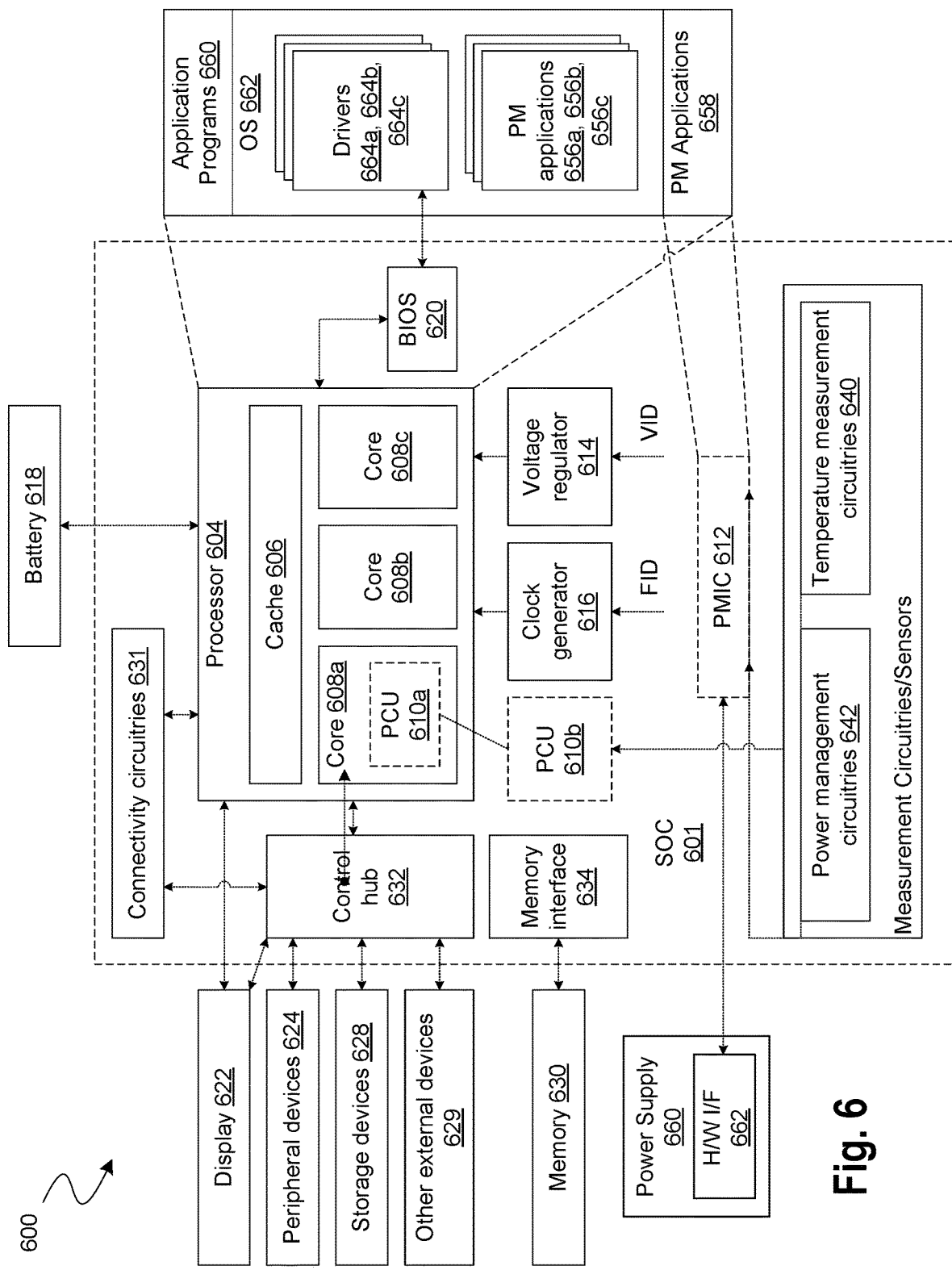
FIG. 6 illustrates a computer system or computing device to provide power supply communications via a shared channel for performance management in accordance with some embodiments.

FIG. 6 illustrates a computer system or computing device to provide power supply communications via a shared channel for performance management in accordance with some embodiments. FIG. 6 illustrates a computer system or computing device 600 (also referred to as device 600) to limit electric current consumption of a module that receives power from a bus, and to assure that the voltage level used by the module and by a host for sideband signaling match, in accordance with some embodiments. It is pointed out that those elements of FIG. 6 having the same reference numbers (or names) as the elements of any other figure can operate or function in any manner similar to that described, but are not limited to such.

In some embodiments, device 600 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 600.

In an example, the device 600 comprises a SOC (System-on-Chip) 601. An example boundary of the SOC 601 is illustrated using dotted lines in FIG. 6, with some example components being illustrated to be included within SOC 601—however, SOC 601 may include any appropriate components of device 600.

In some embodiments, device 600 includes processor 604. Processor 604 can include one or more physical devices, such as microprocessors, application processors, microcontrollers, programmable logic devices, processing cores, or other processing means. The processing operations performed by processor 604 include the execution of an operating platform or operating system on which applications and/or device functions are executed. The processing operations include operations related to I/O (input/output) with a human user or with other devices, operations related to power management, operations related to connecting computing device 600 to another device, and/or the like. The processing operations may also include operations related to audio I/O and/or display I/O.

In some embodiments, processor 604 includes multiple processing cores (also referred to as cores) 608a, 608b, 608c. Although merely three cores 608a, 608b, 608c are illustrated in FIG. 6, the processor 604 may include any other appropriate number of processing cores, e.g., tens, or even hundreds of processing cores. Processor cores 608a, 608b, 608c may be implemented on a single integrated circuit (IC) chip. Moreover, the chip may include one or more shared and/or private caches, buses or interconnections, graphics and/or memory controllers, or other components.

In some embodiments, processor 604 includes cache 606. In an example, sections of cache 606 may be dedicated to individual cores 608 (e.g., a first section of cache 606 dedicated to core 608a, a second section of cache 606 dedicated to core 608b, and so on). In an example, one or more sections of cache 606 may be shared among two or more of cores 608. Cache 606 may be split in different levels, e.g., level 1 (L1) cache, level 2 (L2) cache, level 3 (L3) cache, etc.

In some embodiments, a given processor core (e.g., core 608a) may include a fetch unit to fetch instructions (including instructions with conditional branches) for execution by the core 608a. The instructions may be fetched from any storage devices such as the memory 630. Processor core 608a may also include a decode unit to decode the fetched instruction. For example, the decode unit may decode the fetched instruction into a plurality of micro-operations. Processor core 608a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 608a (for example) may be an out-of-order processor core in one embodiment. Processor core 608a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 608a may also include a bus unit to enable communication between components of the processor core 608a and other components via one or more buses. Processor core 608a may also include one or more registers to store data accessed by various components of the core 608a (such as values related to assigned app priorities and/or sub-system states (modes) association.

In some embodiments, device 600 comprises connectivity circuitries 631. For example, connectivity circuitries 631 includes hardware devices (e.g., wireless and/or wired connectors and communication hardware) and/or software components (e.g., drivers, protocol stacks), e.g., to enable device 600 to communicate with external devices. Device 600 may be separate from the external devices, such as other computing devices, wireless access points or base stations, etc.

In an example, connectivity circuitries 631 may include multiple different types of connectivity. To generalize, the connectivity circuitries 631 may include cellular connectivity circuitries, wireless connectivity circuitries, etc. Cellular connectivity circuitries of connectivity circuitries 631 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 631 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 631 may include a network interface, such as a wired or wireless interface, e.g., so that a system embodiment may be incorporated into a wireless device, for example, cell phone or personal digital assistant.

In some embodiments, device 600 comprises control hub 632, which represents hardware devices and/or software components related to interaction with one or more I/O devices. For example, processor 604 may communicate with one or more of display 622, one or more peripheral devices 624, storage devices 628, one or more other external devices 629, etc., via control hub 632. Control hub 632 may be a chipset, a Platform Control Hub (PCH), and/or the like.

For example, control hub 632 illustrates one or more connection points for additional devices that connect to device 600, e.g., through which a user might interact with the system. For example, devices (e.g., devices 629) that can be attached to device 600 include microphone devices, speaker or stereo systems, audio devices, video systems or other display devices, keyboard or keypad devices, or other I/O devices for use with specific applications such as card readers or other devices.

As mentioned above, control hub 632 can interact with audio devices, display 622, etc. For example, input through a microphone or other audio device can provide input or commands for one or more applications or functions of device 600. Additionally, audio output can be provided instead of, or in addition to display output. In another example, if display 622 includes a touch screen, display 622 also acts as an input device, which can be at least partially managed by control hub 632. There can also be additional buttons or switches on computing device 600 to provide I/O functions managed by control hub 632. In one embodiment, control hub 632 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features).

In some embodiments, control hub 632 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 622 represents hardware (e.g., display devices) and software (e.g., drivers) components that provide a visual and/or tactile display for a user to interact with device 600. Display 622 may include a display interface, a display screen, and/or hardware device used to provide a display to a user. In some embodiments, display 622 includes a touch screen (or touch pad) device that provides both output and input to a user. In an example, display 622 may communicate directly with the processor 604. Display 622 can be one or more of an internal display device, as in a mobile electronic device or a laptop device or an external display device attached via a display interface (e.g., DisplayPort, etc.). In one embodiment display 622 can be a head mounted display (HMD) such as a stereoscopic display device for use in virtual reality (VR) applications or augmented reality (AR) applications.

In some embodiments and although not illustrated in the figure, in addition to (or instead of) processor 604, device 600 may include Graphics Processing Unit (GPU) comprising one or more graphics processing cores, which may control one or more aspects of displaying contents on display 622.

Control hub 632 (or platform controller hub) may include hardware interfaces and connectors, as well as software components (e.g., drivers, protocol stacks) to make peripheral connections, e.g., to peripheral devices 624.

It will be understood that device 600 could both be a peripheral device to other computing devices, as well as have peripheral devices connected to it. Device 600 may have a "docking" connector to connect to other computing devices for purposes such as managing (e.g., downloading and/or uploading, changing, synchronizing) content on device 600. Additionally, a docking connector can allow device 600 to connect to certain peripherals that allow computing device 600 to control content output, for example, to audiovisual or other systems.

In addition to a proprietary docking connector or other proprietary connection hardware, device 600 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 631 may be coupled to control hub 632, e.g., in addition to, or instead of, being coupled directly to the processor 604. In some embodiments, display 622 may be coupled to control hub 632, e.g., in addition to, or instead of, being coupled directly to processor 604.

In some embodiments, device 600 comprises memory 630 coupled to processor 604 via memory interface 634. Memory 630 includes memory devices for storing information in device 600. Memory can include nonvolatile (state does not change if power to the memory device is interrupted) and/or volatile (state is indeterminate if power to the memory device is interrupted) memory devices. Memory device 630 can be a dynamic random access memory (DRAM) device, a static random access memory (SRAM) device, flash memory device, phase-change memory device, or some other memory device having suitable performance to serve as process memory. In one embodiment, memory 630 can operate as system memory for device 600, to store data and instructions for use when the one or more processors 604 executes an application or process. Memory 630 can store application data, user data, music, photos, documents, or other data, as well as system data (whether long-term or temporary) related to the execution of the applications and functions of device 600.

Elements of various embodiments and examples are also provided as a machine-readable medium (e.g., memory 630) for storing the computer-executable instructions (e.g., instructions to implement any other processes discussed herein). The machine-readable medium (e.g., memory 630) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 600 comprises temperature measurement circuitries 640, e.g., for measuring temperature of various components of device 600. In an example, temperature measurement circuitries 640 may be embedded, or coupled or attached to various components, whose temperature are to be measured and monitored. For example, temperature measurement circuitries 640 may measure temperature of (or within) one or more of cores 608a, 608b, 608c, voltage regulator 614, memory 630, a mother-board of SOC 601, and/or any appropriate component of device 600.

In some embodiments, device 600 comprises power measurement circuitries 642, e.g., for measuring power consumed by one or more components of the device 600. In an example, in addition to, or instead of, measuring power, the power measurement circuitries 642 may measure voltage and/or current. In an example, the power measurement circuitries 642 may be embedded, or coupled or attached to various components, whose power, voltage, and/or current consumption are to be measured and monitored. For example, power measurement circuitries 642 may measure power, current and/or voltage supplied by one or more voltage regulators 614, power supplied to SOC 601, power supplied to device 600, power consumed by processor 604 (or any other component) of device 600, etc.

In some embodiments, device 600 comprises one or more voltage regulator circuitries, generally referred to as voltage regulator (VR) 614. VR 614 generates signals at appropriate voltage levels, which may be supplied to operate any appropriate components of the device 600. Merely as an example, VR 614 is illustrated to be supplying signals to processor 604 of device 600. In some embodiments, VR 614 receives one or more Voltage Identification (VID) signals, and generates the voltage signal at an appropriate level, based on the VID signals. Various type of VRs may be utilized for the VR 614. For example, VR 614 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 610a/b and/or PMIC 612. In some embodiments, each core has a network of distributed LDOs to provide efficient control for power management. The LDOs can be digital, analog, or a combination of digital or analog LDOs.

In some embodiments, device 600 comprises one or more clock generator circuitries, generally referred to as clock generator 616. Clock generator 616 generates clock signals at appropriate frequency levels, which may be supplied to any appropriate components of device 600. Merely as an example, clock generator 616 is illustrated to be supplying clock signals to processor 604 of device 600. In some embodiments, clock generator 616 receives one or more Frequency Identification (FID) signals, and generates the clock signals at an appropriate frequency, based on the FID signals.

In some embodiments, device 600 comprises battery 618 supplying power to various components of device 600. Merely as an example, battery 618 is illustrated to be supplying power to processor 604. Although not illustrated in the figures, device 600 may comprise a charging circuitry, e.g., to recharge the battery, based on Alternating Current (AC) power supply received from an AC adapter.

In some embodiments, device 600 comprises Power Control Unit (PCU) 610 (also referred to as Power Management Unit (PMU), Power Controller, etc.). In an example, some sections of PCU 610 may be implemented by one or more processing cores 608, and these sections of PCU 610 are symbolically illustrated using a dotted box and labelled PCU 610a. In an example, some other sections of PCU 610 may be implemented outside the processing cores 608, and these sections of PCU 610 are symbolically illustrated using a dotted box and labelled as PCU 610b. PCU 610 may implement various power management operations for device 600. PCU 610 may include hardware interfaces, hardware circuitries, connectors, registers, etc., as well as software components (e.g., drivers, protocol stacks), to implement various power management operations for device 600.

In some embodiments, device 600 comprises Power Management Integrated Circuit (PMIC) 612, e.g., to implement various power management operations for device 600. In some embodiments, PMIC 612 is a Reconfigurable Power Management ICs (RPMICs) and/or an IMVP (Intel® Mobile Voltage Positioning). In an example, the PMIC is within an IC chip separate from processor 604. PMIC 612 may implement various power management operations for device 600. PMIC 612 may include hardware interfaces, hardware circuitries, connectors, registers, etc., as well as software components (e.g., drivers, protocol stacks), to implement various power management operations for device 600.

In an example, device 600 comprises one or both PCU 610 or PMIC 612. In an example, any one of PCU 610 or PMIC 612 may be absent in device 600, and hence, these components are illustrated using dotted lines.

Various power management operations of device 600 may be performed by PCU 610, by PMIC 612, or by a combination of PCU 610 and PMIC 612. For example, PCU 610 and/or PMIC 612 may select a power state (e.g., P-state) for various components of device 600. For example, PCU 610 and/or PMIC 612 may select a power state (e.g., in accordance with the ACPI (Advanced Configuration and Power Interface) specification) for various components of device 600. Merely as an example, PCU 610 and/or PMIC 612 may cause various components of the device 600 to transition to a sleep state, to an active state, to an appropriate C state (e.g., C0 state, or another appropriate C state, in accordance with the ACPI specification), etc. In an example, PCU 610 and/or PMIC 612 may control a voltage output by VR 614 and/or a frequency of a clock signal output by the clock generator, e.g., by outputting the VID signal and/or the FID signal, respectively. In an example, PCU 610 and/or PMIC 612 may control battery power usage, charging of battery 618, and features related to power saving operation.

The clock generator 616 can comprise a phase locked loop (PLL), frequency locked loop (FLL), or any suitable clock source. In some embodiments, each core of processor 604 has its own clock source. As such, each core can operate at a frequency independent of the frequency of operation of the other core. In some embodiments, PCU 610 and/or PMIC 612 performs adaptive or dynamic frequency scaling or adjustment. For example, clock frequency of a processor core can be increased if the core is not operating at its maximum power consumption threshold or limit. In some embodiments, PCU 610 and/or PMIC 612 determines the operating condition of each core of a processor, and opportunistically adjusts frequency and/or power supply voltage of that core without the core clocking source (e.g., PLL of that core) losing lock when the PCU 610 and/or PMIC 612 determines that the core is operating below a target performance level. For example, if a core is drawing current from a power supply rail less than a total current allocated for that core or processor 604, then PCU 610 and/or PMIC 612 can temporarily increase the power draw for that core or processor 604 (e.g., by increasing clock frequency and/or power supply voltage level) so that the core or processor 604 can perform at a higher performance level. As such, voltage and/or frequency can be increased temporality for processor 604 without violating product reliability.

In an example, PCU 610 and/or PMIC 612 may perform power management operations, e.g., based at least in part on receiving measurements from power measurement circuitries 642, temperature measurement circuitries 640, charge level of battery 618, and/or any other appropriate information that may be used for power management. To that end, PMIC 612 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 610 and/or PMIC 612 in at least one embodiment to allow PCU 610 and/or PMIC 612 to manage processor core energy at least in part based on value(s) detected by one or more of the sensors.

Also illustrated is an example software stack of device 600 (although not all elements of the software stack are illustrated). Merely as an example, processors 604 may execute application programs 650, Operating System 652, one or more Power Management (PM) specific application programs (e.g., generically referred to as PM applications 658), and/or the like. PM applications 658 may also be executed by the PCU 610 and/or PMIC 612. OS 652 may also include one or more PM applications 656*a*, 656*b*, 656*c*. The OS 652 may also include various drivers 654*a*, 654*b*, 654*c*, etc., some of which may be specific for power management purposes. In some embodiments, device 600 may further comprise a Basic Input/Output System (BIOS) 620. BIOS 620 may communicate with OS 652 (e.g., via one or more drivers 654), communicate with processors 604, etc.

For example, one or more of PM applications 658, 656, drivers 654, BIOS 620, etc. may be used to implement power management specific tasks, e.g., to control voltage and/or frequency of various components of device 600, to control wake-up state, sleep state, and/or any other appropriate power state of various components of device 600, control battery power usage, charging of the battery 618, features related to power saving operation, etc.

In some embodiments, device 600 comprises a power supply 660 comprising hardware interface 662. Device 600 may also comprise a PCB (not shown in FIG. 6).

The hardware interface 662 comprises a plurality of conductive contacts. The hardware interface 662 is to couple the power supply 660 to the PCB. The hardware interface 662 is compatible with a power supply design standard comprising a pin-out definition specifying that a first one of the plurality of conductive contacts is to be dedicated to communicating first information of a first type. The first type of information is capable of changing frequently.

In embodiments, the power supply 660 comprises first, second, and third circuitry (not shown in FIG. 6). The first circuitry is to determine the first information of the first type. The second circuitry is to determine second information of a second type, wherein the second type of information changes infrequently or is static. The third circuitry coupled to each of the first circuitry, the second circuitry, and the hardware interface to send via a shared channel, e.g., the first conductive contact, a communication comprising the first information and the second information.

In embodiments, the PCB comprises a connector coupled to the PCB. The connector is to couple the PCB to the power supply 660. The connector is to be coupled to the hardware interface via an interconnect.

In embodiments, an integrated circuit (IC) coupled to the PCB. The IC is electrically coupled to the connector. The IC comprises fourth circuitry to receive the communication, and to process the communication to identify the first information and the second information. In some embodiments, the IC is PMIC 612. In some embodiments, the IC is PCU 610*a* or PCU 610*b*.

In some embodiments, the power supply design standard is an Advanced Technology Extended 12V Only (ATX12VO) power supply standard. In some embodiments, the third circuitry sends the first information in a first time period and sends the second information in a second time period. In some embodiments, the third circuitry sends the first information via a signal in a first range of frequencies and sends the second information via signal in a second range of frequencies.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A power supply comprising: a hardware interface comprising a plurality of conductive contacts, wherein the hardware interface is to couple the power supply to a printed circuit board (PCB) and is compatible with a power supply design standard comprising a pin-out definition, wherein, according to the pin-out definition, a first one of the plurality of conductive contacts is to be dedicated to communicating information of a first type, wherein the first type comprises a power consumption telemetry type; first circuitry to determine first information of the first type; second circuitry to determine second information of a second type, wherein the second type is other than the first type; third circuitry coupled to each of the first circuitry, the second circuitry, and the hardware interface to send via the first conductive contact a communication comprising the first information and the second information.

Example 2: The power supply of example 1, further comprising: the PCB, wherein the PCB comprises a connector coupled to the PCB, the connector is to couple the PCB to the power supply, and the connector is to be coupled to the hardware interface via an interconnect.

Example 3: The power supply of example 2, further comprising: an integrated circuit (IC) coupled to the PCB, wherein: the IC is electrically coupled to the connector; and the IC comprises fourth circuitry: to receive the communication, and to process the communication to identify the first information and the second information.

Example 4: The power supply of example 1, wherein the power supply design standard is an Advanced Technology Extended 12V Only (ATX12VO) power supply standard.

Example 5: The power supply of example 1, wherein the third circuitry is to send the first information in a first time period and to send the second information in a second time period.

Example 6: The power supply of example 1, wherein the third circuitry is to send the first information via a signal in a first range of frequencies and to send the second information via signal in a second range of frequencies.

Example 7: The power supply of example 3, wherein: the power supply further comprises fifth circuitry coupled to the hardware interface and the third circuitry, the fifth circuitry to receive a request for the second information; and the IC further comprises sixth circuitry to send, via the connector, a request to receive the second information.

Example 8: The power supply of example 1, wherein the first information comprises a substantially continuous analog signal corresponding with a power output of the power supply.

Example 9: The power supply of example 1, wherein the second type of information comprises PSU parameter type information, environmental condition of the PSU type information, component health type information, or historical data of the PSU type information.

Example 10: A device comprising: a printed circuit board (PCB) comprising a connector coupled to the PCB, the connector comprising a plurality of interconnects to couple the PCB to a hardware interface of a power supply, wherein the connector is compatible with a pin-out definition of a power supply design standard, wherein, according to the pin-out definition, a first one of the plurality of interconnects is to be dedicated to receiving information of a first type, wherein the first type comprises a power consumption telemetry type; and an integrated circuit (IC) coupled to the connector via the PCB, the IC to participate in communications with the power supply, wherein the IC is electrically coupled to the connector to receive via the first interconnect a communication comprising the first information and second information of a second type other than the first type, and the IC comprises first circuitry to: receive the communication from the power supply, and identify the first information and the second information.

Example 11: The device of example 10, further comprising the power supply comprising: a hardware interface comprising a plurality of conductive contacts, wherein the hardware interface is to couple the power supply to the PCB and is compatible with a power supply design standard comprising a pin-out definition specifying that a first one of the plurality of conductive contacts is to be dedicated to communicating the first information of the first type; second circuitry to determine the first information of the first type; third circuitry to determine second information of the second type; fourth circuitry coupled to each of the second circuitry, the first circuitry, and the hardware interface to send via the first conductive contact the communication comprising the first information and the second information.

Example 12: The device of example 10, wherein the power supply design standard is an Advanced Technology Extended 12V Only (ATX12VO) power supply standard.

Example 13: The device of example 10, wherein the first circuitry is to receive the first information in a first time period and to receive the second information in a second time period.

Example 14: The device of example 10, wherein the first circuitry is to receive the first information via a signal in a first range of frequencies and to receive the second information via signal in a second range of frequencies.

Example 15: The device of example 11, wherein: the power supply further comprises fifth circuitry coupled to the hardware interface and the fourth circuitry, the fifth circuitry to receive a request for the second information; and the IC further comprises sixth circuitry to send, via the connector, a request to receive the second information.

Example 16: A system comprising: a power supply comprising: a hardware interface comprising a plurality of conductive contacts, wherein the hardware interface is to couple the power supply to a printed circuit board (PCB) and is compatible with a power supply design standard comprising a pin-out definition, wherein, according to the pin-out definition, a first one of the plurality of conductive contacts is to be dedicated to communicating information of a first type, wherein the first type comprises a power consumption telemetry type; first circuitry to determine first information of the first type; second circuitry to determine second information of a second type, wherein the second type is other than the first type; third circuitry coupled to each of the first circuitry, the second circuitry, and the hardware interface to send via the first conductive contact a communication comprising the first information and the second information; and the PCB, the PCB comprising a connector, coupled to the PCB, to couple the PCB to the power supply, and to be coupled to the hardware interface via an interconnect.

Example 17: The power supply of example 16, further comprising: an integrated circuit (IC) coupled to the PCB, wherein: the IC is electrically coupled to the connector; and the IC comprises fourth circuitry: to receive the communication, and to process the communication to identify the first information and the second information.

Example 18: The power supply of example 16, wherein the power supply design standard is an Advanced Technology Extended 12V Only (ATX12VO) power supply standard.

Example 19: The power supply of example 16, wherein the third circuitry is to send the first information in a first time period and to send the second information in a second time period.

Example 20: The power supply of example 16, wherein the third circuitry is to send the first information via a signal in a first range of frequencies and to send the second information via signal in a second range of frequencies.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
 a hardware interface comprising a plurality of conductive contacts, wherein the hardware interface is to couple a power supply to a printed circuit board (PCB) and is compatible with a power supply design standard comprising a pin-out definition, wherein, according to the pin-out definition, a first one of the plurality of conductive contacts is to be dedicated to communicating information of a first type, wherein the first type comprises a power consumption telemetry type;
 first circuitry to determine first information of the first type;
 second circuitry to determine second information of a second type, wherein the second type is other than the first type;
 third circuitry coupled to each of the first circuitry, the second circuitry, and the hardware interface to send via the first conductive contact a communication comprising the first information and the second information, wherein the PCB comprises a connector to couple the PCB to the power supply, and
 the connector is to be coupled to the hardware interface via an interconnect; and
 an integrated circuit (IC) coupled to the PCB, wherein:
 the IC is electrically coupled to the connector, and
 the IC comprises fourth circuitry to receive the communication and to process the communication to identify the first information and the second information, wherein the power supply further comprises fifth circuitry coupled to the hardware interface and the third circuitry, the fifth circuitry to receive a request for the second information; and
 the IC further comprises sixth circuitry to send, via the connector, a request to receive the second information.

2. The apparatus of claim 1, wherein the power supply design standard is an Advanced Technology Extended 12V Only (ATX12VO) power supply standard.

3. The apparatus of claim 1, wherein the third circuitry is to send the first information in a first time period and to send the second information in a second time period.

4. The apparatus of claim 1, wherein the third circuitry is to send the first information via a signal in a first range of frequencies and to send the second information via signal in a second range of frequencies.

5. The apparatus of claim 1, wherein the first information comprises a substantially continuous analog signal corresponding with a power output of the power supply.

6. The apparatus of claim 1, wherein the second type of information comprises PSU parameter type information, environmental condition of the PSU type information, component health type information, or historical data of the PSU type information.

7. A device comprising:
 a printed circuit board (PCB) comprising a connector coupled to the PCB, the connector comprising a plurality of interconnects to couple the PCB to a hardware interface of a power supply, wherein the connector is compatible with a pin-out definition of a power supply design standard, wherein, according to the pin-out definition, a first one of the plurality of interconnects is to be dedicated to receiving information of a first type, wherein the first type comprises a power consumption telemetry type; and
 an integrated circuit (IC) coupled to the connector via the PCB, the IC to participate in communications with the power supply, wherein the IC is electrically coupled to the connector to receive via the first interconnect a communication comprising the first information and second information of a second type other than the first type, and
 the IC comprises first circuitry to:
 receive the communication from the power supply, and
 identify the first information and the second information, wherein the power supply comprises:
 a hardware interface comprising a plurality of conductive contacts, wherein the hardware interface is to couple the power supply to the PCB and is compatible with a power supply design standard comprising a pin-out definition specifying that a first one of the plurality of conductive contacts is to be dedicated to communicating the first information of the first type;
 second circuitry to determine the first information of the first type,
 third circuitry to determine second information of the second type, and
 fourth circuitry coupled to each of the second circuitry, the first circuitry, and the hardware interface to send via the first conductive contact the communication comprising the first information and the second information.

8. The device of claim 7, wherein the power supply design standard is an Advanced Technology Extended 12V Only (ATX12VO) power supply standard.

9. The device of claim 7, wherein the first circuitry is to receive the first information in a first time period and to receive the second information in a second time period.

10. The device of claim 7, wherein the first circuitry is to receive the first information via a signal in a first range of frequencies and to receive the second information via signal in a second range of frequencies.

11. The device of claim 7, wherein:
 the power supply further comprises fifth circuitry coupled to the hardware interface and the fourth circuitry, the fifth circuitry to receive a request for the second information; and
 the IC further comprises sixth circuitry to send, via the connector, a request to receive the second information.

12. A system comprising:
 a power supply comprising:
 a hardware interface comprising a plurality of conductive contacts, wherein the hardware interface is to couple the power supply to a printed circuit board (PCB) and is compatible with a power supply design standard comprising a pin-out definition, wherein, according to the pin-out definition, a first one of the plurality of conductive contacts is to be dedicated to communicating information of a first type, wherein the first type comprises a power consumption telemetry type;
 first circuitry to determine first information of the first type;
 second circuitry to determine second information of a second type, wherein the second type is other than the first type;

third circuitry coupled to each of the first circuitry, the second circuitry, and the hardware interface to send via the first conductive contact a communication comprising the first information and the second information;
   wherein the PCB comprises a connector, coupled to the PCB, to couple the PCB to the power supply, and to be coupled to the hardware interface via an interconnect; and
   an integrated circuit (IC) coupled to the PCB, wherein the IC is electrically coupled to the connector, and the IC comprises fourth circuitry to receive the communication and
to process the communication to identify the first information and the second information.

13. The system of claim 12, wherein the power supply design standard is an Advanced Technology Extended 12V Only (ATX12VO) power supply standard.

14. The system of claim 12, wherein the third circuitry is to send the first information in a first time period and to send the second information in a second time period.

15. The system of claim 12, wherein the third circuitry is to send the first information via a signal in a first range of frequencies and to send the second information via signal in a second range of frequencies.

\* \* \* \* \*